United States Patent [15] 3,640,856
Olund [45] Feb. 8, 1972

[54] POLYBUTENE CONTAINING SOLUBLE OILS
[72] Inventor: Sven A. Olund, San Rafael, Calif.
[73] Assignee: Cheveron Research Company, San Francisco, Calif.
[22] Filed: Jan. 27, 1969
[21] Appl. No.: 794,368

[52] U.S. Cl. ............................252/33.2, 72/42, 252/41, 252/42, 252/52, 252/49.5
[51] Int. Cl. ......................................C10m 1/40, C10m 3/18
[58] Field of Search................252/33.2, 41, 42, 49.5, 52; 72/42

[56] References Cited

UNITED STATES PATENTS

| 2,744,870 | 5/1956 | Stillebroer et al. | 252/35 |
| 2,818,386 | 12/1957 | Francis et al. | 252/33.2 |
| 2,913,410 | 11/1959 | Fisher | 252/33.2 |
| 2,920,718 | 1/1960 | Howell et al. | 252/40 |
| 3,019,187 | 1/1962 | Panzer et al. | 252/33.2 |
| 3,132,104 | 5/1964 | Scherer | 252/59 |
| 3,298,951 | 1/1967 | Guminski | 252/52 |
| 3,298,954 | 1/1967 | Brown | 252/56 |
| 3,396,108 | 8/1968 | Caruso | 252/18 |

Primary Examiner—Daniel F. Wyman
Assistant Examiner—I. Vaughn
Attorney—A. L. Snow, F. E. Johnston, B. I. Rowland and J. W. McClain

[57] ABSTRACT

Soluble oils are disclosed which contain, as the principal component, polybutene of 200–500 molecular weight. Also present are an organic dispersant and a $C_{18}$ straight-chain carboxylic acid salt.

7 Claims, No Drawings

POLYBUTENE CONTAINING SOLUBLE OILS

BACKGROUND OF THE INVENTION

This invention relates to soluble oil compositions and in particular to the use of polybutene as the principal component of a soluble oil composition.

"Soluble oils" are known in the lubrication industry as those oils which, upon mixture with water, rapidly form stable oil-in-water emulsions. (As used herein, "soluble oil" refers to the oil composition itself and "soluble oil emulsion" refers to the emulsion of the "soluble oil" in water.) Soluble oil emulsions find numerous uses, including uses as cutting oils and hydraulic fluids. In general, they may be advantageously used wherever a lubricating fluid is also required to function as a heat transfer agent. Thus, a widespread use is as cutting oils where the action of the cutting tool on the metal surface generates a considerable amount of heat. This heat must be rapidly dissipated if the life of the cutting tool is to be extended and the work surfaces protected from marring.

Soluble oil emulsions also have many applications where lubricating fluids are required to be nonflammable or substantially flame-resistant. The soluble oil itself may be a hydrocarbon and have a greater or lesser degree of flammability; however, in use as an emulsion with the water, most soluble oils become substantially nonflammable. These emulsions thus find widespread use in such applications as fire-resistant hydraulic fluids.

SUMMARY OF THE INVENTION

This invention is a soluble oil which has a composition comprising 70–90 parts by weight polybutene, where the polybutene has a number average molecular weight of 200–500, 8–15 parts by weight of an organic dispersant, such as a mahogany sulfonate salt, and, in addition, 0.2–3 parts by weight of a 18 straight-chain carboxylic acid salt.

DETAILED DESCRIPTION OF THE INVENTION

In its broadcast form, the soluble oil composition claimed herein comprises 75–90 parts by weight polybutene, where the polybutene has a number average molecular weight of 200–500, and 8–15 parts by weight of organic dispersant and, in addition, 0.2–3 by weight of $C_{18}$ straight-chain carboxylic acid salt. In some preferred embodiments, the polybutene number average molecular weight is 300–450 and the organic dispersant is nonionic.

The principal component of the soluble oil is polybutene. The number average molecular weight of the polybutene is 200–500, preferably 300–450. The number average molecular weight may be determined by use of a calibrated vapor pressure osmometer. The osmometer is calibrated by using solutions of known molecular weight solutes in benzene. A typical commercial osmometer is the "Model 301A," manufactured by Mechrolab of Mountain View, Calif.

The soluble oil also contains 1–3 parts of $C_{18}$ aliphatic straight-chain carboxylic acid salt. The carboxylic acid may be saturated or unsaturated, generally having not more than two sites of ethylene unsaturation. Illustrative carboxylic acid anions are stearate, oleate, linoleate, linolenate, or mixtures of two or more of these. The cation will be an alkali metal. The alkali metals of atomic number below 20 (lithium, sodium, and potassium) are preferred, with the most preferred being potassium.

The salt of the carboxylic acid may be directly incorporated into the oil as such, but it is often more convenient to form the salt in the oil. This is accomplished by adding to the oil the $C_{18}$ straight-chain carboxylic acid (or a mixture of the $C_{18}$ acids) and alkali metal hydroxide. To a typical oil would be added oleic acid and potassium hydroxide, which would react to form the desired potassium oleate.

The oil will also include 8–15 parts of at least one organic dispersant. The dispersant may be ionic or nonionic. Typical ionic dispersants are the alkali and alkaline earth metal salts of alkyl, alkaryl, and mahogany sulfonates having 10–30 carbon atoms per molecule. The mahogany sulfonates particularly include oil-soluble aromatic sulfonate salts derived from petroleum. Many of the aromatic sulfonates have cycloalkyl (i.e., naphthenic) groups in the side chains attached to the benzene ring. The industrial production of oil-soluble mahogany sulfonates from petroleum is well understood in the art and is described in the literature. Normally, the alkyl sulfonates require at least 20 carbon atoms for oil solubility. The alkaryl sulfonates, however, permit an alkyl portion totaling only about 18 carbon atoms. To attain the requisite oil solubility, therefore, requires that the hydrocarbon portion of the sulfonate have a molecular weight between about 250 and 1,000. Preferably this molecular weight is between 300 and 600.

In a preferred embodiment, the dispersant is nonionic, typically ethoxylated alkyl phenol having 7–15 carbon atoms in the alkyl portion of the molecule and with an ethylene oxide content corresponding to 20–40 percent of the overall molecular weight. With both ionic and nonionic dispersants, it is to be understood that the term "dispersant" includes mixtures of two or more compatible dispersants of the types described. Other additives, such as oxidation inhibitors, rust inhibitors, and bactericides may also be present in small amounts if they are compatible with the other components of the soluble oil and do not adversely affect the ability of the oil to form a stable emulsion with water. Typically, they do not exceed, in total, 2 weight percent of the the entire oil composition, and often are in the parts per million range.

The soluble oil is mixed with water to form the stable product emulsion. In general, water will be the continuous phase and oil the dispersed phase. The range of ratios of oil to water will be 1:4 to 1:100. Preferred is the range 1:10 to 1:20. The exact portion chosen will depend on the particular application in which the product emulsion is to be used.

The following examples will illustrate this invention. All amounts are in parts by weight.

Example 1

Soluble oil A contained 80.7 parts polybutene with the polybutene number average molecular weight being 330. The potassium oleate present was formed by reacting 1.6 parts of oleic acid and 0.5 parts of potassium hydroxide. The sulfonate present was as 11.2 parts of a 60 percent sodium mahogany sulfonate, having a molecular weight of about 400, in a naphthenic oil.

Example 2

Soluble Oil B had a composition similar to that of Soluble Oil A, with the exception that the polybutene used had a number average molecular weight of 440.

Example 3

Soluble Oil C differed from Soluble oils A and B in that it had a nonionic emulsifier. Soluble Oil C contained 88.4 parts of the 330 molecular weight polybutene. Potassium oleate was produced in the oil by reacting 0.3 parts potassium hydroxide with 1.3 parts oleic acid. The nonionic dispersant was present as 10.0 parts of an ethoxylated nonyl phenol with an ethylene oxide content of about 35 percent of the total molecular weight.

The following table will illustrate the advantages of the polybutene soluble oil emulsions of this invention over conventional soluble emulsions of the prior art, as represented by a leading commercial hydrocarbon soluble oil.

The soluble oils of this invention were tested in a "drill-torque" test of the type described by Stokeley in *Lubrication Engineering*, Vol. 9, No. 3, p. 137 (June, 1953). In this test a series of 1-inch deep holes are drilled with a precision-sharpened drill into stainless steel blocks at a constant drilling rate. The drill speed is increased by 50 r.p.m. for each successive hole. The torque on the drill while drilling each hole is measured. Failure of the drill is defined to occur where the torque required to drill the hole is 100 inch-pounds or greater.

In the drill-torque test, the emulsions of the better soluble oils tested will be indicated by producing less torque at a given drill speed and by producing drill failure at a higher drill speed than do the poorer soluble oils. The data of the following table were obtained with the aforementioned commercial hydrocarbon soluble oil and soluble oils A, B, and C, each in an emulsion of 1 part oil to 20 parts water (by volume).

TABLE

| Drill Speed r.p.m. | Drill Torque, in.-lbs. | | | |
|---|---|---|---|---|
| | Commercial Oil | Oil A | Oil B | Oil C |
| 450 | 74 | 80 | 78 | 76 |
| 500 | 91 | 83 | 85 | 84 |
| 550 | >100 | 94 | 87 | 89 |
| 600 | | >100 | 92 | 92 |
| 650 | | | >100 | 98 |
| 700 | | | | >100 |

It is evident from the above table that the soluble oils of this invention (Oils A, B, and C) are comparable to the commercial oil at the lowest drill speed and significantly better than the commercial oil at all higher speeds. Further, the oils of this invention permit operation at higher drill speeds without failure. It is also evident that oil containing the nonionic dispersant, Oil C, is preferred because it permits the highest drill speed without failure.

I claim:

1. A soluble oil comprising 75–90 parts by weight polybutene, said polybutene having a number average molecular weight of 200–500, 8–15 parts by weight of an organic dispersant, and, in addition, 0.2–3 parts by weight of $C_{18}$ straight-chain carboxylic acid salt of alkali metal.

2. The soluble oil described in claim 1 wherein said polybutene average molecular weight is in the range of 300–450.

3. The soluble oil described in claim 1, wherein said dispersant is at least one alkali or alkaline earth metal salt of an alkyl, alkaryl, or mahogany sulfonate having 10–30 carbon atoms per molecule.

4. The soluble oil described in claim 1, wherein said dispersant is nonionic.

5. The soluble oil described in claim 4, wherein said nonionic dispersant is an ethoxylated alkyl phenol having 7–15 carbon atoms in the alkyl portion of the molecule.

6. The soluble oil described in claim 1, wherein said acid salt is an oleate.

7. The soluble oil described in claim 6, wherein said acid salt is potassium oleate.

* * * * *